United States Patent
Wu et al.

(10) Patent No.: US 9,403,102 B2
(45) Date of Patent: Aug. 2, 2016

(54) HEAT EXCHANGE SYSTEM CONFIGURED WITH A MEMBRANE CONTACTOR

(75) Inventors: Hailing Wu, South Windsor, CT (US); Zidu Ma, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 1208 days.

(21) Appl. No.: 13/372,121

(22) Filed: Feb. 13, 2012

(65) Prior Publication Data

US 2013/0206658 A1 Aug. 15, 2013

(51) Int. Cl.
| | |
|---|---|
| *B01D 35/10* | (2006.01) |
| *B01D 35/18* | (2006.01) |
| *B01D 63/00* | (2006.01) |
| *C02F 1/44* | (2006.01) |
| *C02F 1/02* | (2006.01) |
| *B01D 3/00* | (2006.01) |
| *C02F 1/16* | (2006.01) |
| *F24J 3/08* | (2006.01) |
| *F28C 3/08* | (2006.01) |
| *F28D 21/00* | (2006.01) |
| *F28D 15/02* | (2006.01) |

(52) U.S. Cl.
CPC . *B01D 3/007* (2013.01); *C02F 1/16* (2013.01); *F24J 3/08* (2013.01); *F28C 3/08* (2013.01); *F28D 21/0001* (2013.01); *F28D 21/0015* (2013.01); *F28D 15/0266* (2013.01); *Y02E 10/10* (2013.01); *Y02W 10/37* (2015.05)

(58) Field of Classification Search
CPC . C02F 2301/046; C02F 1/18; B01D 2313/38; B01D 61/18; B01D 63/08; B01D 1/00; B01D 61/364
USPC ............................ 210/640, 195.2, 175, 180
See application file for complete search history.

(56) References Cited

U.S. PATENT DOCUMENTS

| | | | |
|---|---|---|---|
| 4,545,862 A | 10/1985 | Gore et al. | |
| 6,299,777 B1 * | 10/2001 | Bowser | 210/640 |
| 7,501,065 B1 | 3/2009 | Bader | |

(Continued)

FOREIGN PATENT DOCUMENTS

| | | |
|---|---|---|
| EP | 1925355 | 5/2008 |
| JP | 62214278 | 9/1987 |

(Continued)

OTHER PUBLICATIONS

International search report for PCT/US13/25921 dated Jun. 2, 2013.

*Primary Examiner* — Ana Fortuna
(74) *Attorney, Agent, or Firm* — O'Shea Getz P.C.

(57) ABSTRACT

A heat exchange system may include a first heat exchange circuit and a second heat exchange circuit. The first heat exchange circuit may circulate a first working fluid sequentially through a first heat exchanger, a second heat exchanger and a membrane contactor. The second heat exchange circuit may direct a second working fluid sequentially through the first heat exchanger and the membrane contactor, where the second working fluid includes solute and solvent. The first heat exchanger and the membrane contactor may transfer heat energy from the second working fluid to the first working fluid, and the second heat exchanger may transfer heat energy from the first working fluid to a third working fluid. The membrane contactor may extract a portion of the solvent from the second working fluid.

19 Claims, 3 Drawing Sheets

(56) References Cited

U.S. PATENT DOCUMENTS

| | | |
|---|---|---|
| 7,721,794 B2 | 5/2010 | Heidenreich et al. |
| 7,789,159 B1 | 9/2010 | Bader |
| 7,871,520 B2 | 1/2011 | Ma et al. |
| 7,913,706 B2 | 3/2011 | DeKraker et al. |
| 8,287,735 B2 * | 10/2012 | Hanemaaijer et al. ........ 210/640 |
| 2003/0145596 A1 | 8/2003 | Noelscher |
| 2009/0077969 A1 | 3/2009 | Prueitt |
| 2010/0025219 A1 | 2/2010 | Ma et al. |
| 2010/0051549 A1 * | 3/2010 | Ma et al. ................... 210/640 |
| 2010/0192575 A1 | 8/2010 | Al-Mayahi et al. |
| 2011/0180148 A1 * | 7/2011 | Xia et al. .................... 137/1 |
| 2014/0124443 A1 * | 5/2014 | McGinnis .................. 210/640 |

FOREIGN PATENT DOCUMENTS

| | | |
|---|---|---|
| JP | 2005262197 | 9/2005 |
| WO | 2010071605 | 6/2010 |

* cited by examiner

HEAT EXCHANGE SYSTEM CONFIGURED WITH A MEMBRANE CONTACTOR

BACKGROUND OF THE INVENTION

1. Technical Field

The present invention relates generally to a heat exchange system and, in particular, to a heat exchange system that may, for example, provide cooling to an electrical power generation system and produce distilled water utilizing geothermal energy and/or low grade waste heat.

2. Background Information

A cooling system for a geothermal and/or a low grade waste heat driven power system may include a pre-cooler such as an evaporative cooler or mister that pre-cools ambient air provided to a condenser. A typical evaporative cooler may include an evaporative cooler surface housed within a cooler duct. During operation, water is directed through the cooler surface, and air is directed through the cooler duct. The water may evaporate into the air as the air passes through the cooler surface. Heat energy from the air may be absorbed by heat of vaporization of the evaporating water, thereby cooling the air. The cooling system may also include an evaporative heat exchanger (e.g., an evaporative condenser) with a heat exchanger surface that may be fully or partially covered with water allowing water evaporation at the surface.

Scale may form on the cooler surface and/or the heat exchanger surface where, for example, the water on a portion of the cooler surface and/or the heat exchanger surface completely evaporates. Such scale is formed, for example, where contaminants such as minerals in the water collect on the cooler surface and/or the heat exchanger surface as the water evaporates. The scale may increase pressure drop across the cooler surface and/or the heat exchanger surface and decrease the efficiency of the evaporative cooler and, thus, the geothermal and/or low grade waste heat driven power system.

Potable (e.g., drinking) water typically includes less contaminants than water found in the ocean, a lake, a pond, a stream or an underground well. The evaporative cooler therefore may utilize potable water in order to reduce the formation of scale on the cooler surface. Potable water, however, may be a scarce and highly regulated commodity in many regions of the world and, thus, not available for use in a geothermal power system.

SUMMARY OF THE DISCLOSURE

According to a first aspect of the invention, a heat exchange system includes a first heat exchange circuit and a second heat exchange circuit. The first heat exchange circuit circulates a first working fluid sequentially through a first heat exchanger, a second heat exchanger and a membrane contactor. The second heat exchange circuit directs a second working fluid sequentially through the first heat exchanger and the membrane contactor, where the second working fluid includes solute and solvent. The first heat exchanger and the membrane contactor transfer heat energy from the second working fluid to the first working fluid, and the second heat exchanger transfers heat energy from the first working fluid to a third working fluid. The membrane contactor extracts a portion of the solvent from the second working fluid.

According to a second aspect of the invention, a heat exchange system includes a Rankine cycle power system and a heat exchange circuit. The Rankine cycle power system circulates a first working fluid sequentially through an evaporator, a turbine generator, a condenser and a membrane contactor. The heat exchange circuit directs a second working fluid sequentially through the evaporator and the membrane contactor, where the second working fluid includes solute and solvent. The evaporator and the membrane contactor transfer heat energy from the second working fluid to the first working fluid, and the condenser transfers heat energy from the first working fluid to a third working fluid. The turbine generator is driven by the first working fluid and generates electrical power. The membrane contactor extracts a portion of the solvent from the second working fluid.

The foregoing features and the operation of the invention will become more apparent in light of the following description and the accompanying drawings.

DETAILED DESCRIPTION OF THE INVENTION

Figure 1:
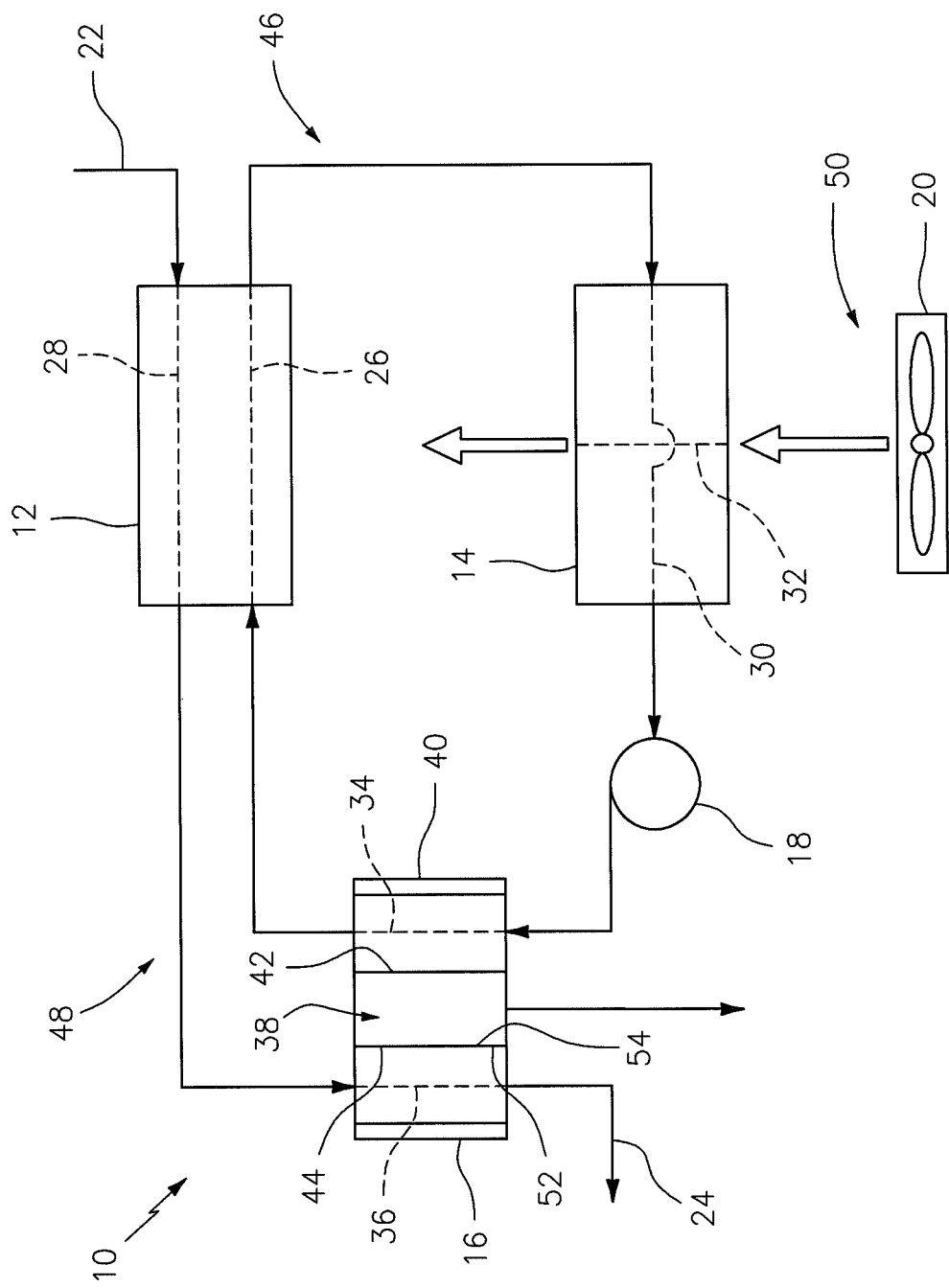
FIG. 1 is a block diagram illustration of a heat exchange system configured as a geothermal heating and distilled water production system.

FIG. 1 illustrates a heat exchange system 10 that may be configured as, for example, a geothermal heating system. The system 10 includes a first heat exchanger 12, a second heat exchanger 14 and a membrane contactor 16. The system 10 may also include a first flow regulator 18 (e.g., a pump, a compressor and/or a valve), a second flow regulator 20 (e.g., a fan, a blower, a vacuum and/or a pump), a working fluid inlet 22 and/or a working fluid outlet 24.

The first heat exchanger 12 may be configured as a (e.g., counter-flow) liquid-to-liquid evaporator. The first heat exchanger 12 includes a first heat exchange passage 26 and a second heat exchange passage 28.

The second heat exchanger 14 may be configured as a liquid-to-gas condenser. The second heat exchanger 14 includes a first heat exchange passage 30 and a second heat exchange passage 32 (e.g., an airflow duct).

The membrane contactor 16 may be configured as a liquid gap membrane distillation device, an air gap membrane distillation device, a direct contact membrane distillation device, a vacuum membrane distillation device, and/or a sweeping gas distillation device. The membrane contactor 16 may include a first flow channel 34, a second flow channel 36 and a third flow channel 38, which extend through a membrane contactor housing 40. The first flow channel 34 may be formed by a non-porous (e.g., tubular) first channel sidewall 42. The second flow channel 36 may be formed by a porous (e.g., tubular) second channel sidewall 44 constructed from, for example, a vapor diffusion membrane. Examples of various vapor diffusion membranes are disclosed in U.S. patent application Ser. Nos. 12/231,288, 12/220,887 and 12/002,690, which are hereby incorporated by reference in their entirety, and assigned to the assignee of the present invention. The third flow channel 38 may extend between the first channel sidewall 42 and the second channel sidewall 44. The present invention, however, is not intended to be limited to the aforesaid channel sidewall materials or construction, or any particular membrane contactor configurations. In some embodiments, for example, the membrane contactor 16 may include a plurality of distillation devices connected in a serial or parallel configuration.

The first heat exchange passage 26, the first heat exchange passage 30, the first flow regulator 18 and the first flow channel 34 may be sequentially connected in a (e.g., closed loop) first heat exchange circuit 46. The working fluid inlet 22, the second heat exchange passage 28, the second flow channel 36 and the working fluid outlet 24 may be sequentially connected in a (e.g., open loop) second heat exchange circuit 48. The second flow regulator 20 may be fluidly coupled with the second heat exchange passage 32 forming a third heat exchange circuit 50.

During system operation, a first working fluid may be circulated through the first heat exchange circuit 46. The first working fluid may be directed, for example, by the first flow regulator 18 sequentially through the membrane contactor 16, the first heat exchanger 12 and the second heat exchanger 14. Examples of the first working fluid may include an organic or inorganic coolant, refrigerant, etc.

A second working fluid may be directed through the second heat exchange circuit 48. The second working fluid may be directed, for example, from the working fluid inlet 22 to the working fluid outlet 24 sequentially through the first heat exchanger 12 and the membrane contactor 16. The second working fluid may include solute that is (e.g., fully or partially) dissolved, emulsified and/or suspended within solvent. Examples of the second working fluid may include mineral water, brackish water, saline water, sea water, waste water, brine and/or manufacturing process fluid. Examples of the solute may include minerals, salt, dirt and/or waste particulates. Examples of the solvent may include water and/or manufacturing process fluids.

A third working fluid may be directed through the third heat exchange circuit 50. The third working fluid may be directed, for example, by the second flow regulator 20 through the second heat exchanger 14. Examples of the third working fluid may include coolant gases such as ambient air. Alternative examples of the third working fluid may include an organic or inorganic coolant, refrigerant, etc. where the second heat exchanger 14 is configured as, for example, a liquid-to-liquid condenser.

The system 10 may exchange heat energy between the first working fluid, the second working fluid, and the third working fluid. Heat energy may be transferred from the second working fluid to the first working fluid through the first heat exchanger 12, for example, where temperature $T_1$ of the first working fluid within the first heat exchange passage 26 is less than temperature $T_2$ of the second working fluid within the second heat exchange passage 28. The transfer of the heat energy may heat and vaporize the first working fluid, and cool the second working fluid.

Heat energy may be transferred from the first working fluid to the third working fluid through the second heat exchanger 14, for example, where temperature $T_3$ (e.g., $T_3 > T_1$) of the first working fluid in the first heat exchange passage 30 is greater than temperature $T_4$ (e.g., $T_4 < T_2$) of the third working fluid in the second heat exchange passage 32. The transfer of the heat energy may cool and condense the first working fluid, and heat the third working fluid.

Heat energy may also be transferred from the second working fluid to the first working fluid, for example, where temperature $T_5$ (e.g., $T_1 > T_5 > T_3$) of the first working fluid within the first flow channel 34 is less than temperature $T_6$ (e.g., $T_2 > T_6 > T_4$) of the second working fluid within the second flow channel 36. The transfer of the heat energy may heat the first working fluid, and cool the second working fluid. The membrane contactor 16 therefore may preheat the first working fluid that is provided to the first heat exchanger 12.

The temperature differential within the membrane contactor 16 between the temperature $T_5$ of the first working fluid and the temperature $T_6$ of the second working fluid may create a pressure differential across the second channel sidewall 44. Pressure $P_1$ at a second flow channel surface 52 of the second channel sidewall 44, for example, may be greater than pressure $P_2$ at a third flow channel surface 54 of the second channel sidewall 44. Such a pressure differential may cause a portion of the solvent from the second working fluid to vaporize, and migrate from the second flow channel 36 into the third flow channel 38 through the pores in the second channel sidewall 44. The solvent vapor may subsequently condense within the third flow channel 38. In this manner, the membrane contactor 16 may extract at least a portion of the solvent from the second working fluid while, for example, also preheating the first working fluid as described above. Examples of an extracted solvent may include potable water, distilled process fluid (e.g., water), etc.

Figure 2:
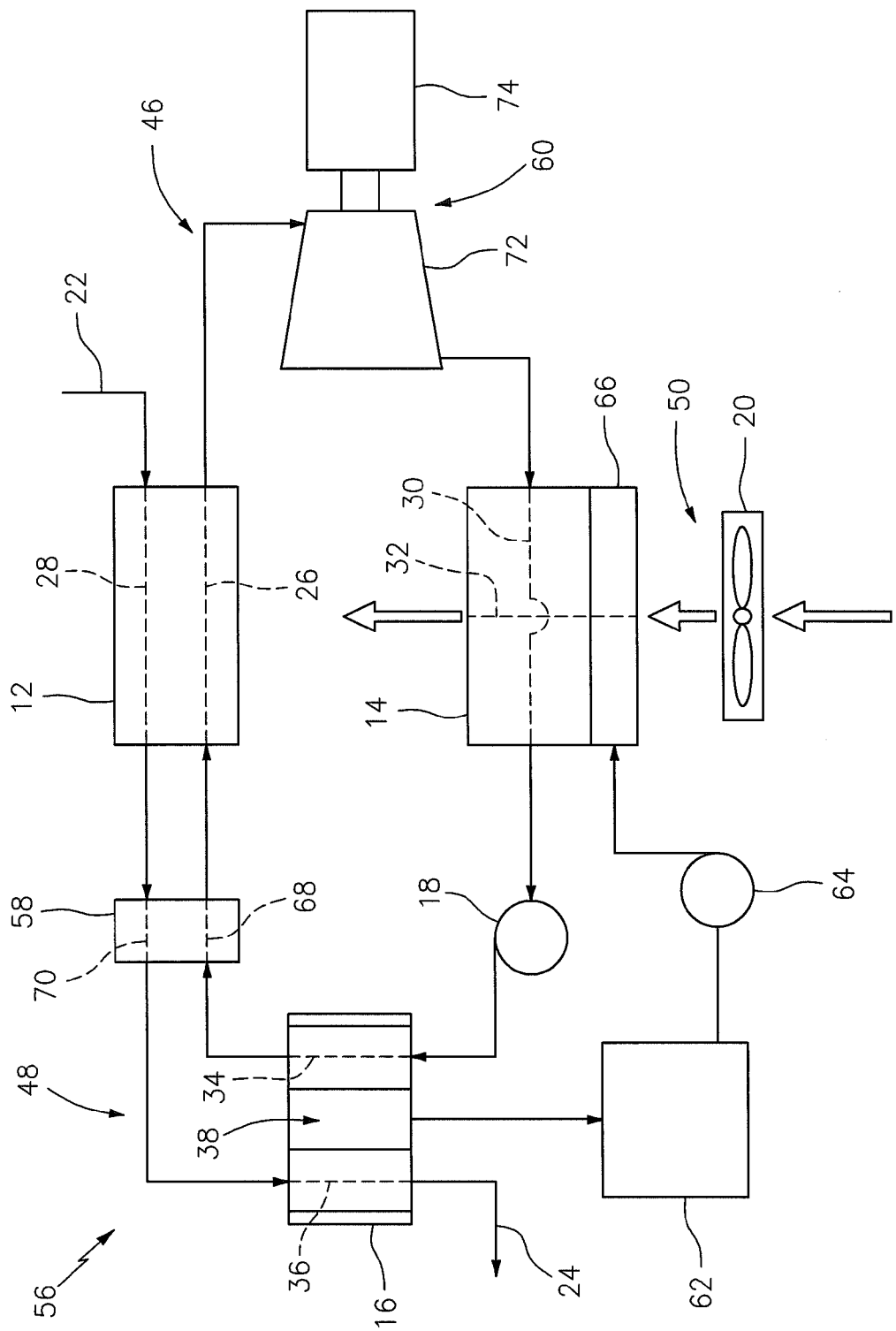
FIG. 2 is a block diagram illustration of a heat exchange system configured as a power and distilled water production system.

FIG. 2 illustrates a heat exchange system 56 that may be configured as, for example, a thermal power system. Examples of a thermal power system may include a geothermal power system, a (e.g., organic) Rankine cycle power system, etc. In contrast to the system 10 in FIG. 1, the system 56 may also include a pre-heater 58, a turbine generator 60, a solvent reservoir 62, a third flow regulator 64 (e.g., a pump and/or a valve) and/or a pre-cooler 66 (e.g., a solvent mister, an evaporative cooler, etc.).

The pre-heater 58 may include a first heat exchange passage 68 and a second heat exchange passage 70. The first heat exchange passage 68 may be connected in-line with the first heat exchange circuit 46 between the first flow channel 34 and the first heat exchange passage 26. The second heat exchange passage 70 may be connected in-line with the second heat exchange circuit 48 between the second heat exchange passage 28 and second flow channel 36. The pre-heater 58 may exchange heat energy between the first working fluid and the second working fluid. The pre-heater 58 may transfer heat energy from the second working fluid to the first working fluid, for example, where temperature $T_7$ (e.g., $T_1 > T_7 > T_5$) of the first working fluid within the first heat exchange passage 68 is less than temperature $T_8$ (e.g., $T_2 > T_8 > T_6$) of the second working fluid within the second heat exchange passage 70. The transfer of heat energy therefore may preheat the first working fluid that is provided to the first heat exchanger 12, and cool the second working fluid.

The turbine generator 60 may include a turbine 72 configured with an electrical generator 74. The turbine 72 may be connected in-line with the first heat exchange circuit 46 between the first heat exchange passage 26 and the first heat exchange passage 30. The turbine 72 may be driven by the vapor of the first working fluid received from the first heat exchanger 12, which may cause the electrical generator 74 to generate electrical power.

The solvent reservoir 62 is connected to the third flow channel 38, and may collect and store the solvent extracted by the membrane contactor 16 from the second working fluid. The third flow regulator 64 may be connected between the solvent reservoir 62 and the pre-cooler 66, and direct the extracted solvent from the solvent reservoir 62 to the pre-cooler 66. The pre-cooler 66 may cool the third working fluid that is directed into the second heat exchange passage 32 utilizing the extracted solvent; e.g., misting the extracted solvent into the third working fluid. The solvent can also be directed to the second heat exchanger 14 to enhance heat transfer by evaporation.

Figure 3:
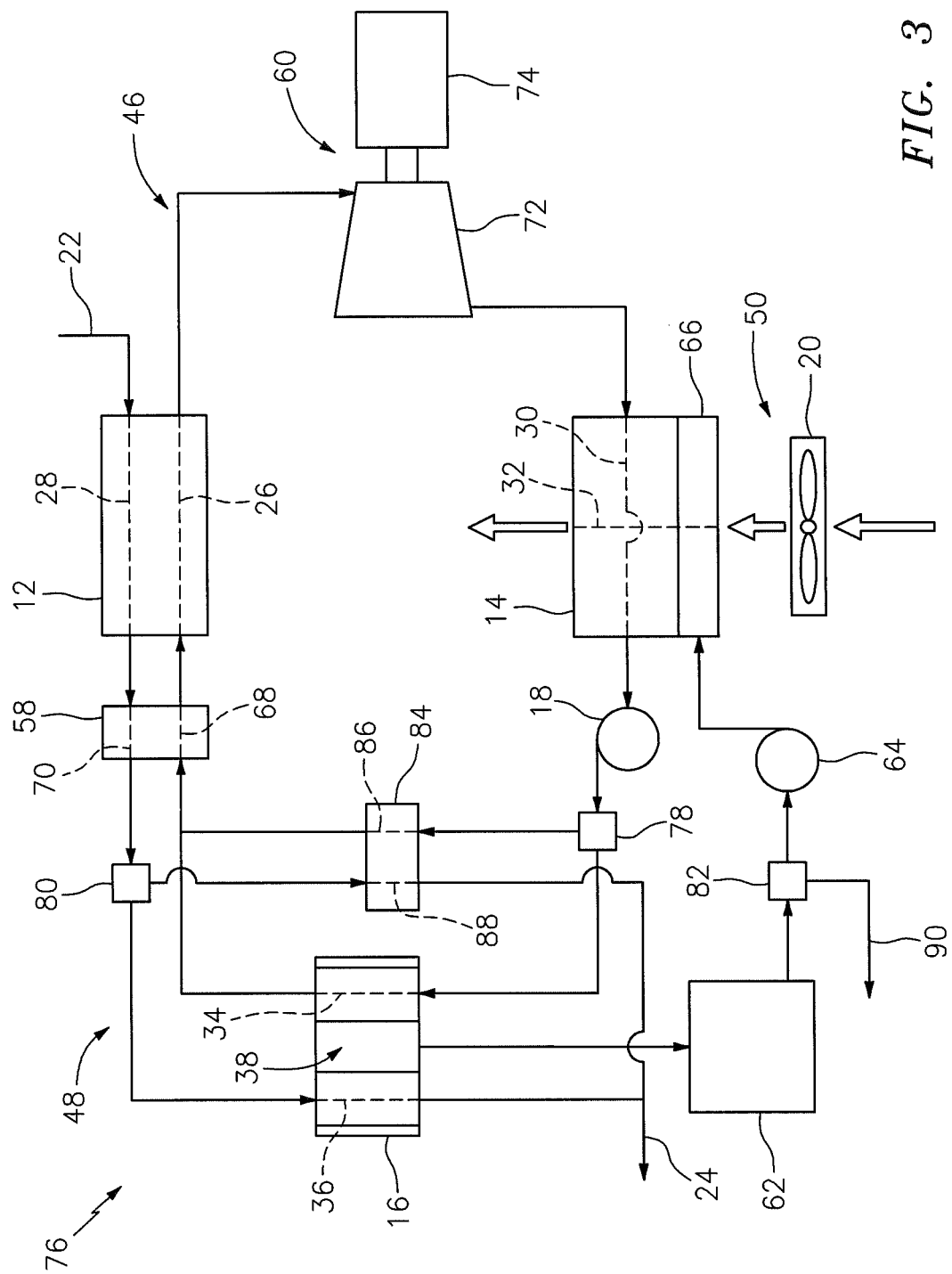
FIG. 3 is a block diagram illustration of another heat exchange system configured as a thermal power and distilled water production system.

FIG. 3 illustrates a heat exchange system 76 that may be configured as, for example, a thermal power system. In contrast to the system 56 in FIG. 2, the system 76 may also include a first valve 78, a second valve 80, a third valve 82 and/or a second pre-heater 84. Each valve 78, 80 and 82 may respectively include, for example, a three-way valve or a plurality of two-way valves.

The second pre-heater 84 may include a first heat exchange passage 86 and a second heat exchange passage 88. The first heat exchange passage 86 may be connected in-line with the first heat exchange circuit 46 between the first flow regulator 18 and the first heat exchange passage 68, and in parallel to the first flow channel 34. The second heat exchange passage 88 may be connected in-line with the second heat exchange circuit 48 between the second heat exchange passage 70 and the working fluid outlet 24, and in parallel with the second flow channel 36. The second pre-heater 84 may exchange heat energy between the first working fluid and the second working fluid. The second pre-heater 84, for example, may transfer heat energy from the second working fluid to the first working fluid where temperature $T_9$ (e.g., $T_1 > T_9 > T_5$) of the first working fluid within the first heat exchange passage 86 is less than temperature $T_{10}$ (e.g., $T_2 > T_{19} > T_6$) of the second working fluid within the second heat exchange passage 88. The transfer of the heat energy therefore may preheat the first working fluid that is provided to the pre-heater 58, and cool the second working fluid.

The first valve 78 may connect the first flow regulator 18 to the first heat exchange passage 86 and/or the first flow channel 34. The second valve 80 may connect the second heat exchange passage 70 to the second heat exchange passage 88 and/or the second flow channel 36. The third valve 82 may connect the solvent reservoir 62 to the third flow regulator 64 and a solvent outlet 90.

The system 76 may be operated in a plurality of different modes of operation. During a first mode of operation, for example, the first valve 78 and the second valve 80 may respectively direct the first working fluid and the second working fluid through the membrane contactor 16. The membrane contactor 16 may extract the solvent from the second working fluid and preheat the first working fluid provided to the pre-heater 58. During a second mode of operation, the first valve 78 and the second valve 80 may respectively direct the first working fluid and the second working fluid through the second pre-heater 84. The second pre-heater 84 may preheat the first working fluid provided to the pre-heater 58. The second mode of operation may be utilized where, for example, the solvent reservoir 62 is full, the solvent is not used or needed to pre-cool the third working fluid with the pre-cooler 66, and/or the solvent is not used or needed to cool the surface of the second heat exchanger 14. During a third mode of operation, the third valve 82 may direct the extracted solvent to the pre-cooler 66 for cooling the third working fluid. During a fourth mode of operation, the third valve 82 may direct the extracted solvent to the solvent outlet 90, which may be connected to, for example, a (e.g., building or community) potable water supply system. During a fifth mode of operation, the third valve 82 may direct the extracted solvent to both the pre-cooler 66 and the solvent outlet 90.

In some embodiments, an additional heat exchanger may be connected between the third flow channel 38 and the solvent reservoir 62 in order to cool the extracted solvent before being collected and stored. In other embodiments, the pre-heater 58 may be omitted from the system 76.

In some embodiments, the working fluid inlet 22 may receive the second working fluid from a geothermal source such as an above and/or below ground body of water (e.g., the ocean, a lake, a pond, a stream, an underground well, etc.). In other embodiments, the second working fluid (e.g., a process fluid) may be received from manufacturing equipment. In still other embodiments, the second working fluid may be received from a solar water heating system.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A heat exchange system, comprising:
 a first heat exchange circuit that circulates a first working fluid sequentially through a first heat exchanger, a second heat exchanger and a membrane contactor; and
 a second heat exchange circuit that directs a second working fluid sequentially through the first heat exchanger and the membrane contactor, the second working fluid comprising solute and solvent;
 wherein the first heat exchanger and the membrane contactor transfer heat energy from the second working fluid to the first working fluid, and the second heat exchanger transfers heat energy from the first working fluid to a third working fluid;
 wherein the membrane contactor extracts a portion of the solvent from the second working fluid; and
 wherein the membrane contactor comprises
  a first flow channel connected in-line with the first heat exchange circuit, the first flow channel comprising a channel sidewall;
  a second flow channel connected in-line with the second heat exchange circuit, the second flow channel comprising a vapor diffusing membrane; and
  a third flow channel that receives vapor of the extracted solvent that migrates across the vapor diffusion membrane from the first flow channel towards the channel sidewall.

2. The system of claim 1, wherein the second working fluid comprises at least one of mineral water, brackish water, saline water, sea water, waste water, brine and manufacturing process fluid.

3. The system of claim 2, wherein the extracted solvent comprises at least one of potable water and distilled water.

4. The system of claim 1, further comprising a solver reservoir that receives the extracted solvent.

5. The system of claim 1, further comprising a pre-cooler that receives the extracted solvent, and reduces temperature of the third working fluid that is directed into the second heat exchanger utilizing the extracted solvent.

6. The system of claim 5, wherein the pre-cooler comprises at least one of a solvent mister and an evaporative cooler.

7. The system of claim 1, wherein the first heat exchanger comprises an evaporator, the second heat exchanger comprises a condenser, and the first heat exchange circuit further comprises a turbine that is driven by the first working fluid.

8. The system of claim 7, further comprising a pre-heater connected between the evaporator and the membrane contactor, wherein the pre-heater transfers heat energy from the second working fluid to the first working fluid.

9. The system of claim 7, further comprising
 a pre-heater that transfers heat energy from the second working fluid to the first working fluid;
 a first valve that directs the first working fluid from the condenser to the pre-heater during a first mode of operation, and from the condenser to the membrane contactor during a second mode of operation; and
 a second valve that directs the second working fluid from the evaporator to the pre-heater during the first mode of operations, and from the evaporator to the membrane contactor during the second mode of operation.

10. The system claim 1, wherein the membrane contactor comprises a counter-flow membrane contactor.

11. The system of claim 1, wherein the membrane contactor comprises at least one of a liquid gap membrane distillation device, an air gap membrane distillation device, and a direct contact membrane distillation device.

12. The system of claim 1, wherein the membrane contactor comprises one of a sweeping gas distillation device and a vacuum membrane distillation device.

13. The system of claim 1, wherein the first heat exchange circuit is configured in an organic Rankine cycle power system.

14. The system of claim 1, wherein the third working fluid comprises air.

15. A heat exchange system, comprising:
a Rankine cycle power system that circulates a first working fluid sequentially through an evaporator, a turbine generator, a condenser and a membrane contactor; and
a heat exchange circuit that directs a second working fluid sequentially through the evaporator and the membrane contactor, the second working fluid comprising solute and solvent;
wherein the evaporator and the membrane contactor transfer heat energy from the second working fluid to the first working fluid, and the condenser transfers heat energy from the first working fluid to a third working fluid;
wherein the turbine generator is driven by the first working fluid and generates electrical power;
wherein the membrane contactor acts a portion of the solvent from the second working fluid; and
wherein the membrane contactor comprises
a first flow channel connected in-line with the first heat exchange circuit, the first flow channel comprising a channel sidewall;
a second flow channel connected in-line with the second heat exchange circuit, the second flow channel comprising a vapor diffusing membrane; and
a third flow channel that receives vapor of the extracted solvent that migrates across the vapor diffusion membrane from the first flow channel towards the channel sidewall.

16. The system of claim 15, wherein
the second working fluid comprises at least one of mineral water, brackish water, saline water, sea water, waste water, brine and manufacturing process fluid; and
the extracted solvent comprises at least one of potable water and distilled water.

17. The system of claim 16, further comprising a solvent reservoir that receives the extracted solvent.

18. The system of claim 16, further comprising a pre-cooler that receives the extracted solvent, and reduces temperature of the third working fluid that is directed into the condenser utilizing the extracted solvent.

19. The system of claim 16, wherein the membrane contactor comprises at least one of a liquid gap membrane distillation device, an air gap membrane distillation device, and a direct contact membrane distillation device.

* * * * *